United States Patent [19]

Klukis

[11] 4,436,207

[45] Mar. 13, 1984

[54] AUTOMATIC CORN SORTING AND INSPECTION SYSTEM

[76] Inventor: Edward L. Klukis, 1270 Marshall Dr., S.E., Salem, Oreg. 97302

[21] Appl. No.: 261,942

[22] Filed: May 8, 1981

[51] Int. Cl.[3] .......................... B07C 5/10; G02B 5/16

[52] U.S. Cl. .................................. 209/577; 209/586; 209/587; 250/227

[58] Field of Search ............... 209/587, 586, 580, 581, 209/582, 651, 652, 598, 540, 555, 576, 577, 827; 250/233 R, 227, 358.1; 356/237, 72, 73

[56] References Cited

U.S. PATENT DOCUMENTS

| | | | |
|---|---|---|---|
| 3,207,307 | 9/1965 | Means | 209/927 X |
| 3,270,880 | 9/1966 | Brian et al. | 209/586 |
| 3,334,740 | 8/1967 | McCollough et al. | 209/587 |
| 3,365,699 | 1/1968 | Foster | 209/586 X |
| 3,385,434 | 5/1968 | Nelson | 209/587 X |
| 3,453,440 | 7/1969 | Muir et al. | 250/227 |
| 3,480,141 | 11/1969 | Rock, Jr. | 209/586 X |
| 3,563,376 | 2/1971 | Zegna | 209/927 X |
| 3,612,274 | 10/1971 | Schmidt et al. | 209/581 |
| 3,947,088 | 3/1976 | French | 250/227 |
| 4,132,314 | 1/1979 | von Beckmann et al. | 209/586 |

*Primary Examiner*—Robert B. Reeves
*Assistant Examiner*—Donald Hajec
*Attorney, Agent, or Firm*—Harvey B. Jacobson

[57] ABSTRACT

A corn sorting and inspection system automatically inspects various characteristics of ears of corn positioned on an endless conveyor and moved past a series of consecutive grading and removal stations, ears of corn not having charcteristics in conformance with predetermined standards set at each station are removed from the conveyor system at the end of the particular station, thereby sorting those ears of corn which meet the predetermined standards from those which are considered flawed. The ears of corn are positioned lengthwise parallel to the direction of movement and in a single file on the endless conveyor and passed through each of the individual grading and removal sections, the ears of corn being automatically inspected for smut, short ears, unhushed ears, cob diameter and kernel damage. Each grading and removal station grades or inspects the individual ears as they pass under or through standard L.E.D. scanners which sense certain light reflective characteristic of the ear of corn or length of time required for the ear to pass the sensing device.

4 Claims, 16 Drawing Figures

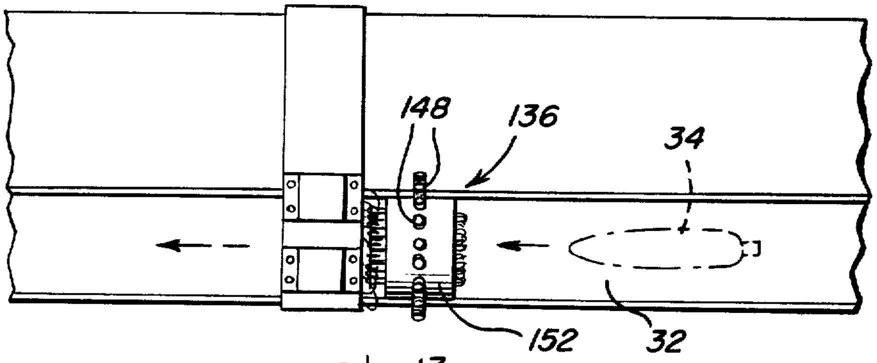
Fig. 11
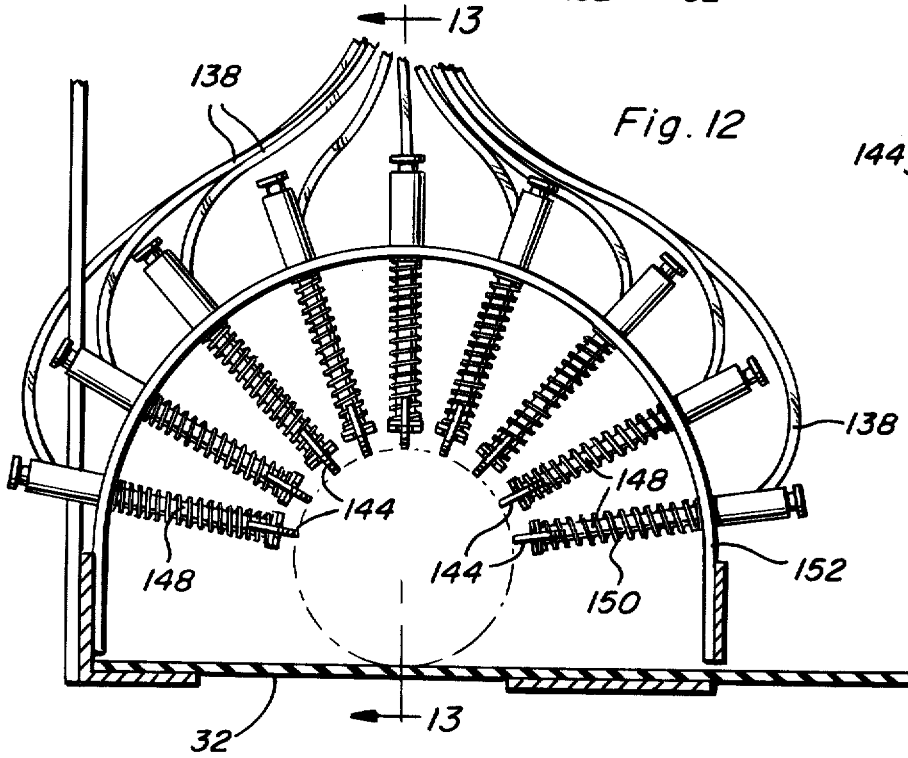
Fig. 12
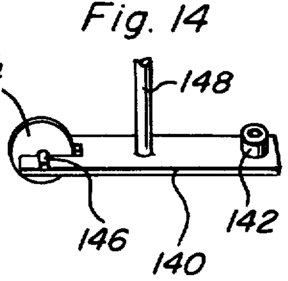
Fig. 14
Fig. 13
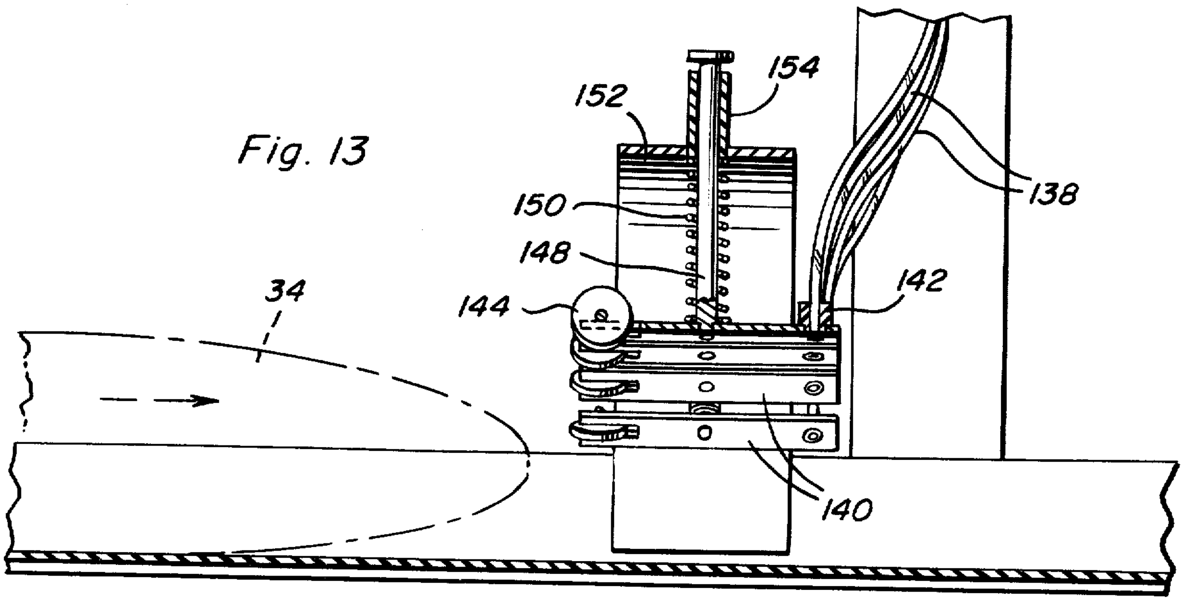

AUTOMATIC CORN SORTING AND INSPECTION SYSTEM

BACKGROUND OF THE INVENTION

Field of the Invention

The present invention relates to food sorting and, more particularly, to the sorting of food by consecutive automatic inspection of a plurality of characteristics of the particular food.

Specifically, the present invention relates to an automatic food sorting and inspection system comprising a novel sequence of grading and removal stations, each of which senses a particular characteristic of the food passing therethrough. The sorting and inspection system of the present invention has particular usefulness for grading husked of ears of corn.

Photoelectric devices and methods have been employed in the past for the sorting of food according to maturity and quality. Such food-sorting methods have generally employed a light source which illuminates the food with light and logic circuitry to measure the characteristics of the light reflected from the surface of the food to provide an indication of the maturity of the food. The most usual characteristic of the food which is measured as an indication of maturity is the color of the light which is reflected from the food. For example, in instances in which apples are to be graded according to maturity, the color of light which is reflected from the surface of the apple will vary from predominately green when the apple is immature to predominately red when the apple has fully matured. Thus, as the apples become fully mature, the intensity of the light in the red spectrum which is reflected from the apple will increase and will provide an indication of the maturity of the apple which may be measured automatically. An example of a produce grader which operates on a similar principle is U.S. Pat. No. 4,095,696, issued June 20, 1978, to Sherwood, which utilizes reflected light to separate vegetables, such as red tomatoes, from foreign matter consisting of, rocks, and the like. U.S. Pat. No. 3,612,274, issued Oct. 12, 1971, to Schmidt et al, states that while produce graders similar to Sherwood are effective when the color change between immature and overmature foods are great, sorting techniques which rely primarily on color are generally inadequate whenever the fdod which is desired to be sorted exhibits only a very small color change between immature and overmature and when the grades which are to be distinguished from each other display little if any color difference. This prior patent states that one food which exhibits only a small color change is corn. The food-sorting technique of the Schmidt patent sorts foods by sensing only a single light beam which is reflected from the food and measures characteristics such as color, size and texture of the food by use of only a single photoelectric cell. The patent states that the use of a single light source is an improvement over prior sorting methods in which additional photoelectric sorting methods and devices have been employed to grade foods either separately or in conjunction with color sorting. The Schmidt et al patent, however, senses the reflected light from the corn as the corn passes under the sensing device in a cross-wise manner, and thus the light strikes only a narrow band of the ear of corn.

The sorting and inspection system of the present invention not only automatically grades the maturity of the corn, but the system also automatically grades many other characteristics of the corn which cannot be accomplished utilizing the food sorting method and apparatus of the prior art patents. In the present invention, the whole ear of the corn is inspected automatically for color variations, size and numerous other characteristics by means of a plurality of photoelectric devices which heretofore have not been combined in a manner to provide substantially total automatic inspection and sorting of corn. The present invention has substantially eliminated the need for manually visualizing the corn for sorting acceptable produce from unacceptable produce. U.S. Pat. No. 2,791,330, issued May 7, 1957, to Carlson, discloses a machine for handling green corn including washing, visual inspection and culling, separation according to size, and delivery to cutting machines. The device is a mechanical device and does not utilize the photoelectric sensing means of the inspection and sorting system of the present invention. The Carlson patent still relies on significant visual inspection for sorting acceptable and unacceptable ears of corn.

Other patented inspection devices utilizing photoelectric sensing means include U.S. Pat. No. 3,038,606, issued June 12, 1962, to Leaver et al, which is utilized for inspecting the level of contents of cans or packages; U.S. Pat. No. 3,052,353, issued Sept. 4, 1962, to Pritchett, which discloses a means for sorting ore having a radioactive component; and U.S. Pat. No. 3,207,307, issued Sept. 21, 1965, to Means, which discloses a bobbin sorting mechanism.

SUMMARY OF THE INVENTION

Briefly, the present invention provides for an automatic corn sorting and inspection system which is capable of inspecting whole ears of corn one at a time and for a variety of characteristics in which each characteristic is inspected at a different grading and removal station, the ears of corn being conveyed past the individual stations by movement of an endless conveyor on which the ear is positioned lengthwise parallel to the movement of the conveyor. Each station comprises a light scanning device which is manipulated and positioned at each station so as to accurately and automatically determine the acceptability of the ear of corn with respect to the particular characteristic which is being inspected. Removal means associated with the scanning devices are provided at each station to automatically remove from the conveyor any ears of corn which do not meet the predetermined acceptable standards set for each food characteristic at the respective grading and removal station. Accordingly, ears of corn are sorted by removal of those which are considered unacceptable from the remaining acceptable ears.

Generally, the automatic corn sorting and inspection system of the present invention comprises a plurality of grading and removal stations which inspect and sort unhusked ears of corn for different characteristics. The unhusked ears of corn are placed on an endless conveyor lengthwise parallel to the movement of the conveyor and in a single file manner. The grading and removal stations comprise a station inspecting for mold growth, commonly known as smut, a station inspecting for ears of corn which are too short, a station inspecting for ears of corn which still contain all or portions of the husks, a cob diameter grading and removal station and a station to inspect ears of corn for kernel damage. Each grading and removal station includes a light sensing device which is positioned so as to provide accurate grading of the respective characteristic and provides automatic removal of an unacceptable ear of corn which does not meet a predetermined standard. At each station, the whole ear of corn is inspected and in two stations, e.g., the unhusked ear and kernel damage grading and removal stations, the conveyor is structured so as to turn the ears of corn over to insure accurate grading. Further, the kernel damage grading and removal station utilizes a novel light sensing device in which ears of corn pass through a scanning tunnel of fiber optic tubes, the fiber optic tubes being associated with means to maintain a proper focal length of light striking the corn cob. While light scanning devices, including those of the photoelectric type, have been used in food sorting systems and sorting systems in general, the present invention provides a novel combination of grading and removal stations for sorting corn in which the light sensors at each station are arranged to automatically grade a particular characteristic of the corn and sort the corn with respect to a predetermined standard. Further, while other food sorting systems may have utilized various types of light sensing devices to inspect several food characteristics, none of the systems to-date have utilized the combination of automatic grading and removal stations of the present invention.

Accordingly, it is a primary object of the present invention to provide a corn sorting and inspection system which automatically inspects, grades and sorts ears of corn according to predetermined standards in order to remove those ears of corn which do not meet such standards.

Another object of the invention is to provide an automatic corn sorting and inspection system comprising a novel combination of grading and removal stations for grading ears of corn for characteristics which heretofore have never been graded by automatic inspection systems, or at least by automatic inspection systems containing the combination of stations as the inspection system of the present invention.

Still another object of the present invention is to provide a corn sorting and inspection system which comprises a plurality of automatic grading and removal stations each of which contains a light sensing device positioned so as to grade a particular characteristic of the corn at the station.

In accordance with the immediately preceding object, another object of the invention is to provide a novel light sensing device which is capable of inspecting unhusked ears of corn for kernel damage.

Still yet another object of the invention is to provide an automatic corn sorting and inspection system in which whole ears of corn are inspected at each particular grading and removal station.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 11 is a top plan view of an alternative sensing device for use in the kernel damage grading and removal station.

FIG. 12 is a front elevational view of the alternative sensing device for the kernel damage grading and removal station.

FIG. 13 is a transverse sectional view of the alternative sensing device, taken generally along the line 13—13 of FIG. 12.

FIG. 14 is a fragmentary elevational view of an optic tube roller which is positioned on the sensing device of FIG. 12 for insuring the proper focal length of the optic tubes during sensing for damaged kernels.

DETAILED DESCRIPTION OF THE INVENTION

Figure 1A:
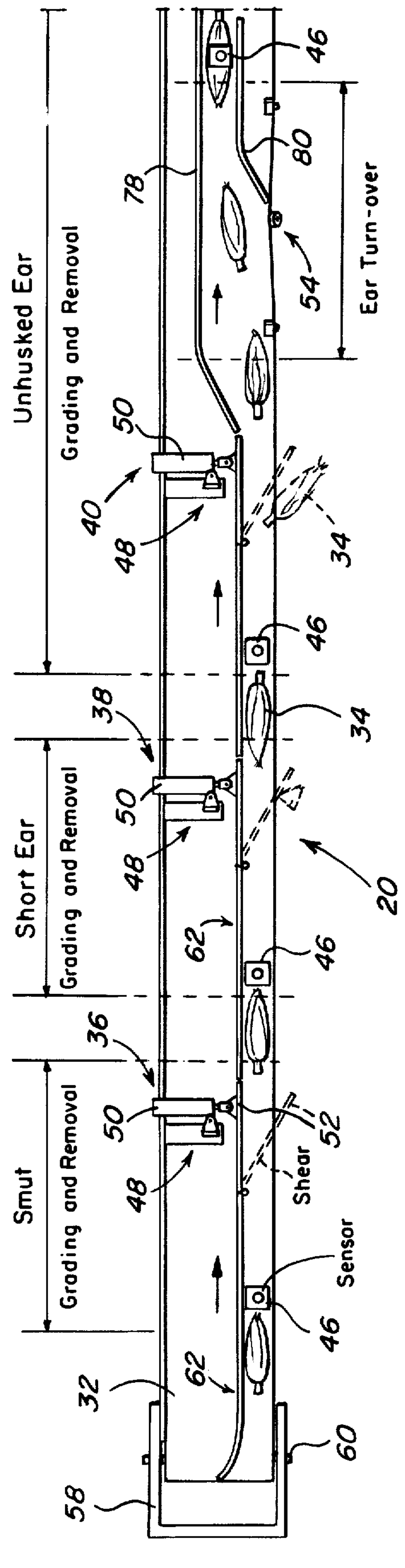
FIGS. 1*a* and 1*b* illustrate a top plan view of the automatic corn sorting and inspection system of the present invention in which an endless conveyor is utilized to move the individual ears of corn past each grading and removal station.
Figure 2A:
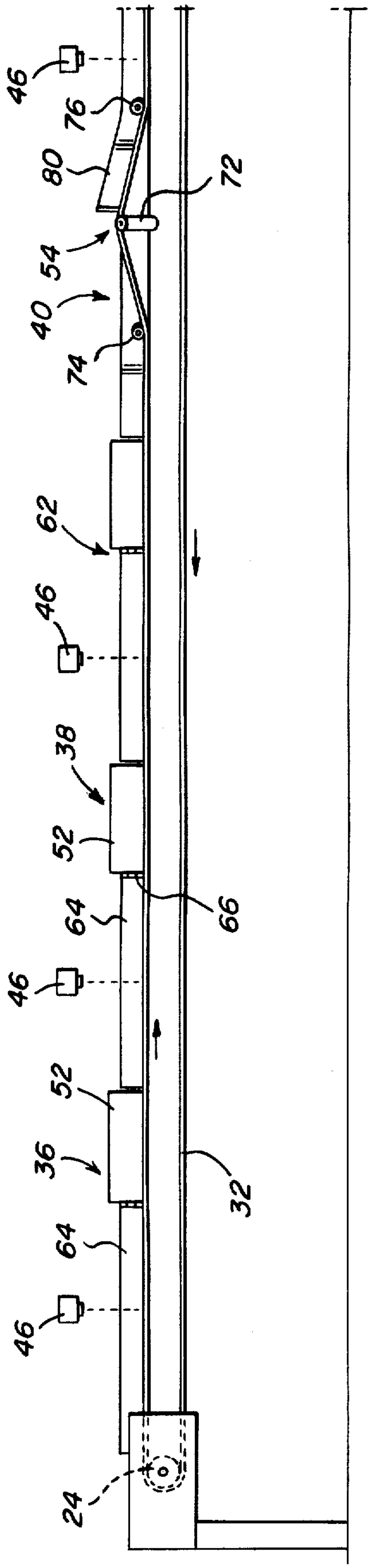
FIGS. 2*a* and 2*b* are side elevational views of the automatic corn sorting and inspection systems of FIGS. 1*a* and 1*b*.
Figure 1B:
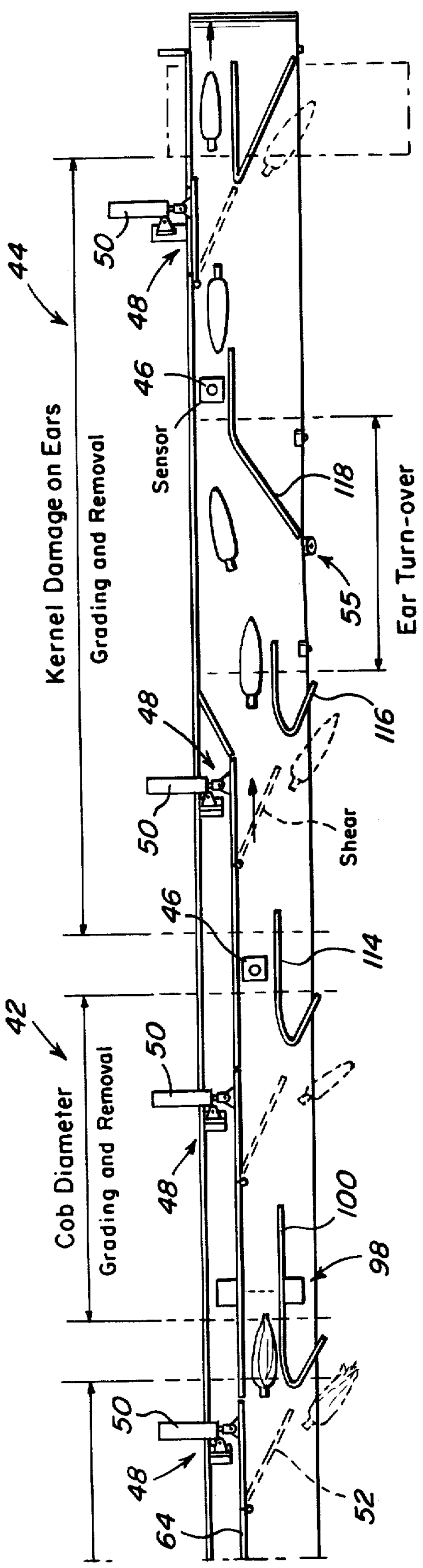
Figure 2B:
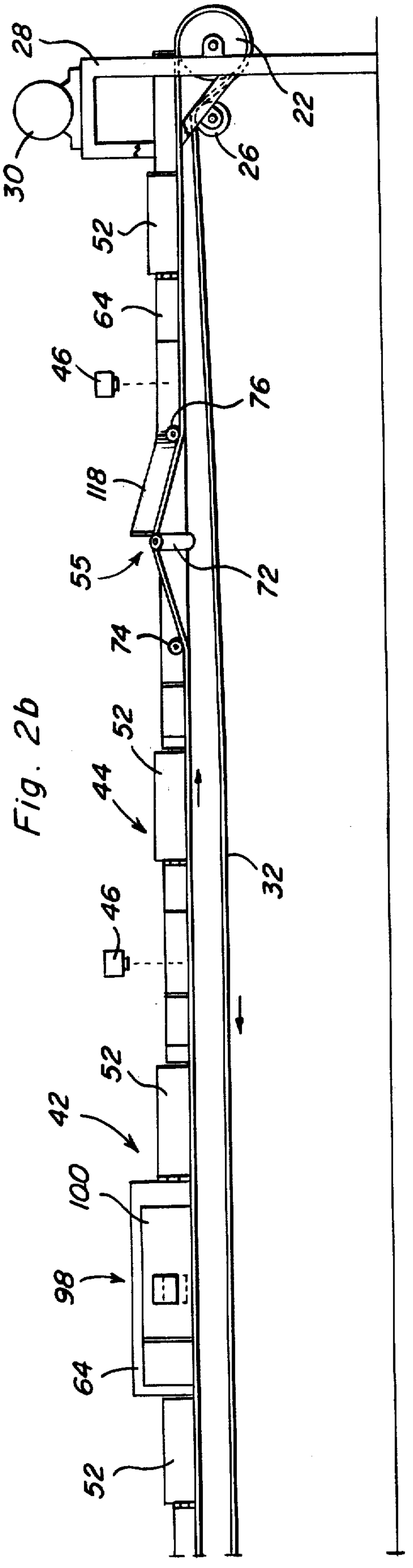

Referring to FIGS. 1*a*, 1*b*, 2*a* and 2*b*, the automatic corn sorting inspection system generally indicated by reference numeral 20 includes a standard endless conveyor comprising head roll 22, tail roll 24, takeup roll 26, motor mount 28 and motor 30 associated with head roll 22 to provide rotation of roll 22 and movement of endless conveyor belt 32. Endless conveyor belt 32 is laced together and is powered by head roll 22 which is driven by motor 30 through a typical sprocket and chain arrangement. The particular type of conveyor utilized is not considered a part of the invention and any conveyor system may be utilized so long as such conveyor meets the objectives of the invention. The ears of corn generally indicated by reference numeral 34, presumably husked, are positioned on top of conveyor belt 32 lengthwise such that the longitudinal axis of ears of corn 34 are parallel to the direction of movement of conveyor belt 32 and are placed thereon in single file whereby the individual ears of corn 34 are inspected one at a time through the respective grading and removal stations.

Corn sorting and inspection system 20 comprises up to five different grading and removal stations positioned consecutively along the length of the conveyor belt 32 which moves relative to each station. Each grading and removal station is set forth in FIGS. 1*a* and 1*b*, system 20 comprising a station 36 which inspects individual ears of corn 34 for smut, a black mold which grows along the corn cob; station 38 which grades individual ears of corn 34 according to length; station 40 which inspects the individual ears of corn 34 to determine if all or part of the husk still remains attached to the corn cob; a cob diameter grading and removal station 42 which determines the relative diameter of each ear of corn 34 and a station 44 to determine whether the individual ears of corn 34 contain damaged kernels. Each grading and removal station automatically grades or inspects individual ears of corn 34 as they pass under or through one or more standard light sensors 46 positioned at each station. Light sensors 46 are typically standard L.E.D. scanners and are uniquely positioned at each station so as to accurately inspect and grade the individual ears of corn with reference to the particular characteristic inspected at each individual station. Often, ears of corn 34 will be covered by a thin film of water from corn washing systems. Accordingly, light sensors 46 can be provided with polarized lenses to eliminate any glare caused by the water film and thus assure accurate sensing and a better quality of inspection. Light sensors 46 are electrically connected to a shearing mechanism 48 also positioned at each station and which includes an air cylinder 50 electrically hooked through timers and time delays (not shown) to light sensors 46 to open and close conveyor shears 52 depending on whether the individual ears of corn 34 meet the predetermined standards of acceptability set at each station. Ears of corn 34 which are not acceptable are thrown from conveyor belt 32 for disposal or further treatment. The particular electrical circuitry required to operate shearing mechanism 48 through sensing device 46 is not a part of the present invention and can comprise essentially any known logic circuitry which can compare a predetermined value to one that is sensed and which will then operate shearing mechanism 48, if appropriate after the values have been compared.

Smut grading and removal station 36 is useful in removing from conveyor belt 32 ears of corn 34 which contain smut, a black mold or fungus which grows on the corn cob during certain periods of the year. Light sensor 46 in smut grading and removal station 36 sends a beam of light which strikes the individual ears of corn 34 as they pass underneath sensor 46. Sensor 46 senses the reflected light from ears 34. In view of the black color of smut, by sensing the characteristics of the reflected light as to color or intensity, sensor 46 can easily determine whether smut does in fact exist. If an ear of corn 34 contains smut, sensor 46 will activate shearing mechanism 48, open conveyor shear 52 once the particular smut infected ear of corn is adjacent shearing mechanism 48 and thus remove ear 34 from endless conveyor belt 32. In short ear grading and removal station 38, the individual ears of corn 34 are again passed under sensor 46 one at a time. The length of ears 34 is determined by the duration of time sensor 46 senses the ear of corn 34 passing thereunder. Time duration can be determined by noting differences in the time it takes the reflected light to reach the sensor such as would exist when light from sensor 46 strikes conveyor belt 32 or the ear of corn 34 or by comparing differences in color between ear of corn 34 and conveyor belt 32. If ear of corn 34 is not of an acceptable length, air cylinder 50 in station 38 is actuated, shearing the short ear of corn off conveyor belt 32. Corn ears which do not contain smut and are of an acceptable length pass into unhusked ear grading and removal station 40. Station 40 consists of two identical and spaced light sensors 46 and identical shearing mechanisms 48, each of which are associated with respective sensors 46. Sensors 46 and associated shearing mechanisms 48 of station 40 are separated by turnover roller 54 which is inserted underneath conveyor belt 32 and is added for the purpose of rolling ear of corn 34 over to insure the complete inspection of the whole ear. Station 40 is included in system 20 for the purpose of determining whether any ears 34 are unhusked or contain portions of husks which render the produce unacceptable for finish processing. Unhusked ears or portions of husks still remaining on ears 34 can be detected by each of spaced sensors 46 because of the differences in the light reflective characteristics between the husks and corn kernels. The husk texture reflects light much differently than the kernels which have a more glossly surface. Further, sensing devices 46 could also sense the color differences between the green-like husk and the yellow color of the corn kernels. Ears 34 which are unhusked or contain portions of the husk are sheared from conveyor belt 32 by shearing mechanisms 48 which are actuated by the respective associated sensing devices 46.

Figure 4:
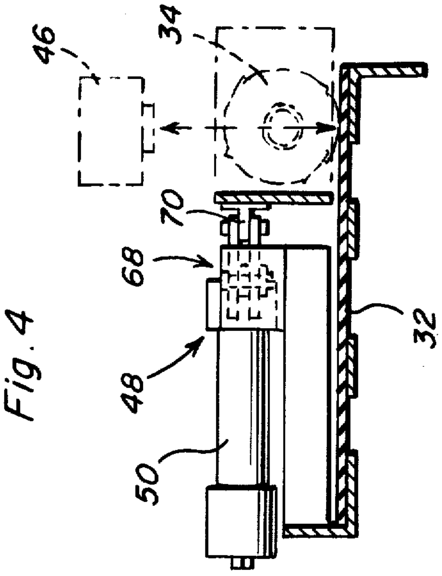
FIG. 4 is a transverse sectional view illustrating a grading and removal station, taken generally along the line 4—4 of FIG. 3, and which is equivalent to the smut, short ear and unhusked ear grading and removal stations.
Figure 3:
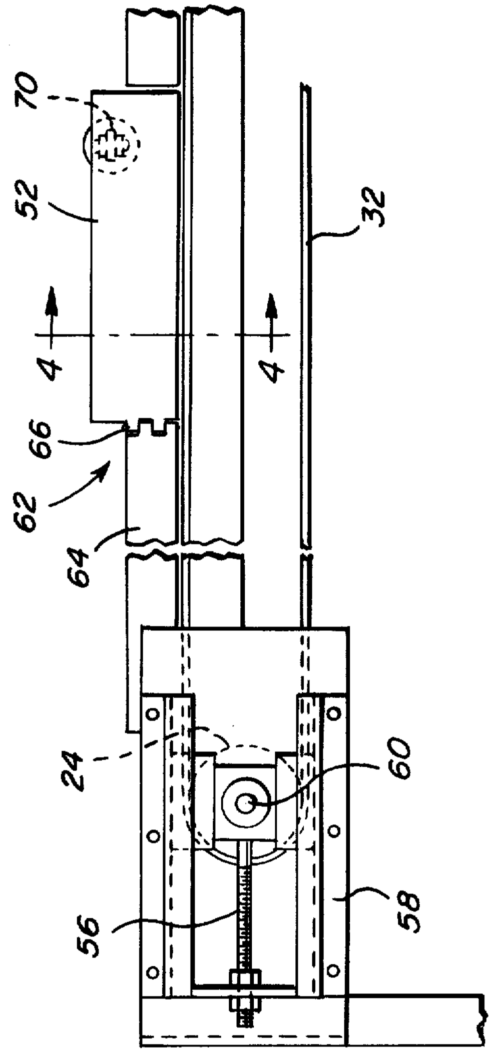
FIG. 3 is a side elevational view illustrating a portion of the conveyor support structure and removal means to shear unacceptable ears of corn from the conveyor.

In FIGS. 3 and 4, there is illustrated a sensing device 46 as well as a shearing mechanism 48 which are used for stations 36, 38 and 40. Further shown is conveyor belt 32 driven around tail roll 24 which is movable along adjustment screw 56 for controlling tension. Tail roll 24 is positioned for rotation within a frame 58 which supports roll 24 for rotation about central axle 60. Placed above conveyor belt 32 is guide wall 62 formed of stationary guide plates 64 and pivotal conveyor shear 52 movable about hinge 66 which secures shear 52 to a stationary guide plate 64. Shearing mechanism 48 further comprises air cylinder 50 electrically connected to sensing device 46 through conventional timers and time delay circuitry (not shown). Cylinder 50 includes a piston and piston rod assembly 68 which is movable across the length of conveyor belt 32 and is attached to shear 52 at lug 70. Activation of air cylinder 50 by sensors 46 causes piston and piston rod assembly 68 to extend, pivoting shear 52 across conveyor belt 32 about hinge 66 and thus push the unacceptable ear of corn 34 adjacent shear 52 off conveyor belt 32. In stations 36, 38 and 40, sensor 46 is positioned above conveyor belt 32 and emits a beam of light which strikes each ear of corn 34 that passes longitudinally underneath sensing device 46. By comparing various characteristics of the reflected light striking sensor 46 with a predetermined standard, the detection of smut, unacceptable short ears of corn and any unhusked ears can be accomplished with the appropriate actuation of shearing mechanism 48 to remove and sort the unacceptable ears from those which are acceptable and which continue to pass through the various grading and removal stations. Unacceptable ears of corn 34 are removed from the conveyor mechanism for further treatment, such as the removal of smut or the removal of husks or portions thereof which are detected in unhusked ear grading and removal station 40. Alternative shearing mechanisms may be used in place of pivoting shear 52, such as an air blast timed to blow unacceptable ears off the conveyor or a drop-out or trap door mechanism.

Figure 6:
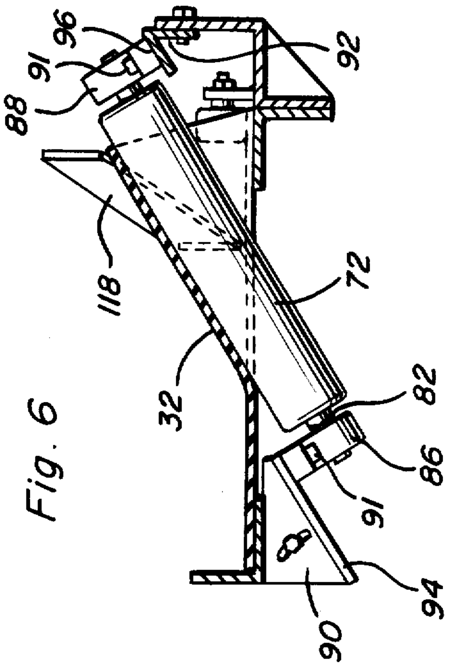
FIG. 6 is a transverse sectional view of the ear turnover section, taken generally along the line 6—6 of FIG. 5.
Figure 5:
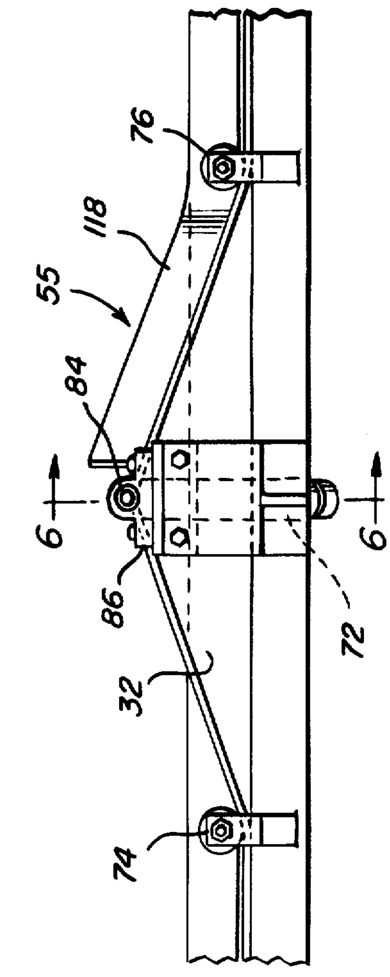
FIG. 5 is an enlarged side elevational view illustrating the ear turnover section of the conveyor positioned in each of the unhusked ear and kernel damage grading and removal stations.

FIGS. 5 and 6 illustrate ear turnover 55 which is utilized in station 44 to insure that the whole ear 34 is inspected by the respective sensing devices 46. Ear turnover 55 is equivalent to ear turnover 54 provided in station 40. Ear turnovers 54 and 55 comprise turnover roll 72 and a pair of guide rolls 74 and 76 placed on opposite sides of turnover roll 72. Conveyor belt 32 is guided to pass over turnover roll 72 and under guide rolls 74 and 76 which maintain the proper tension on conveyor belt 32 as it passes over turnover roll 72. Turnover roll 72 is mounted at an angle from the horizontal so as to lift one end of conveyor belt 32 and thereby cause ears of corn 34 to turn or roll over so as to expose the side previously contacting conveyor belt 32 to the light being emitted from the individual sensing devices 46. In ear turnover 54, guide walls 78 and 80 (FIG. 1*a*) insure that ears 34 turnover the proper amount for accurate inspection. Further guide walls 78 and 80 maintain ears 34 in line directly underneath second sensing device 46 along the center of conveyor belt 32, replacing the single guide wall 62 which guided ears of corn 34 along the outer edge of conveyor belt 32. In ear turnover 55, (FIG. 1*b*) guide wall 118 performs the same function as guide walls 78 and 80. Turnover roll 72 is mounted in the same manner for both ear turnovers 54 and 55. Axle 82 of roll 72 is mounted within a pair of bearings 84 positioned within respective bearing blocks 86 and 88 which are bolted to mounting brackets 90 and 92, respectively, by means of bolts 91. Brackets 90 and 92 comprise angled faces 94 and 96, respectively, which support respective bearing blocks 86 and 88 for mounting of turnover roll 72 in the illustrated angular displaced position.

Figure 8:
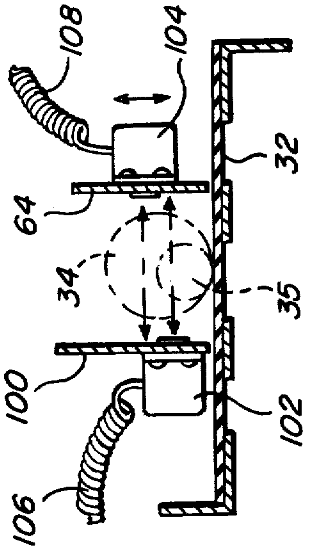
FIG. 8 is a transverse sectional view of the sensing device of the cob diameter grading and removal station, taken generally along the line 8—8 of FIG. 7.
Figure 7:
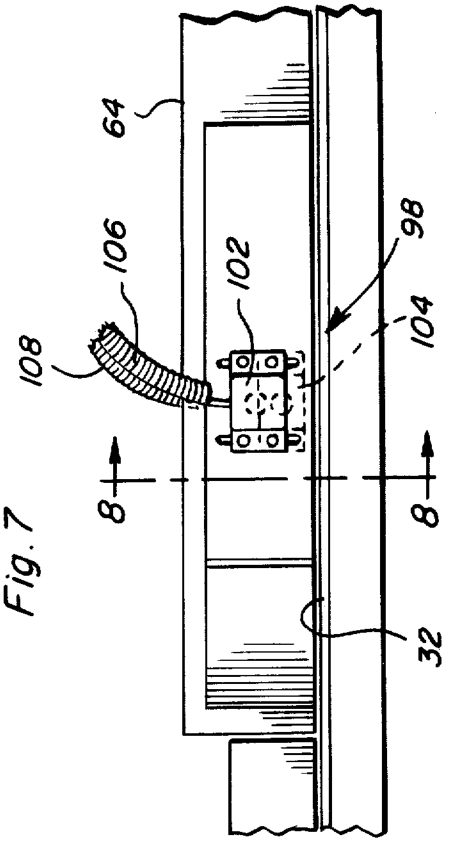
FIG. 7 is a side elevational view illustrating the sensing device provided with the cob diameter grading and removal station.

Referring again to FIGS. 1*b* and 2*b*, ears 34 which contain no smut, are of an acceptable length and are properly husked pass to cob diameter grading and removal station 42. Station 42 comprises a pair of horizontally spaced light sensing devices 46 which form light sensor 98. Light sensor 98 is positioned so as to emit a beam of light across conveyor belt 32 in order to inspect and sort the ears of corn 34 with respect to cob diameter. Inasmuch as ears 34 are now travelling at the center of conveyor due to ear turnover 54, guide wall 100 placed over conveyor belt 32 is added and with the placement of guide walls 64 directs ears 34 in the proper alignment with light sensor 98. Light sensor 98 is coupled with a shearing mechanism 48 equivalent to those used in the prior stations for removing unacceptable ears 34 from conveyor belt 32. FIGS. 7 and 8 illustrate light sensor 98. Light sensor 98 comprises a pair of equivalent light sensors 102 and 104, mounted on respective guide walls 100 and 64, respectively. Ears 34 pass between the pair of sensors 102 and 104 during passage through station 42. Sensors 102 and 104 are electrically connected to shearing mechanism 48 through leads 106 and 108. Sensor 102 senses the presence of ear of corn 34 and is stationary while sensor 104 is adjustable vertically for movement above conveyor belt 32 and determines the cob diameter. The light beam emitted from each of sensors 102 and 104 travels horizontally across conveyor belt 32 and across the path of travel of ears 34. Sensor 104 is vertically adjusted so as to emit a light beam at a distance above conveyor belt 32 equal to the minimum cob diameter which is considered acceptable. Ear 34 which is of an acceptable diameter will be sensed by sensor 104. However, if an ear of corn has a diameter which is too small, such as ear of corn 35, which will be sensed by sensor 102 but not sensed by light emitted from sensor 104, shearing mechanism 48 will be actuated to remove ear of corn 35 from conveyor belt 32.

Figure 10:
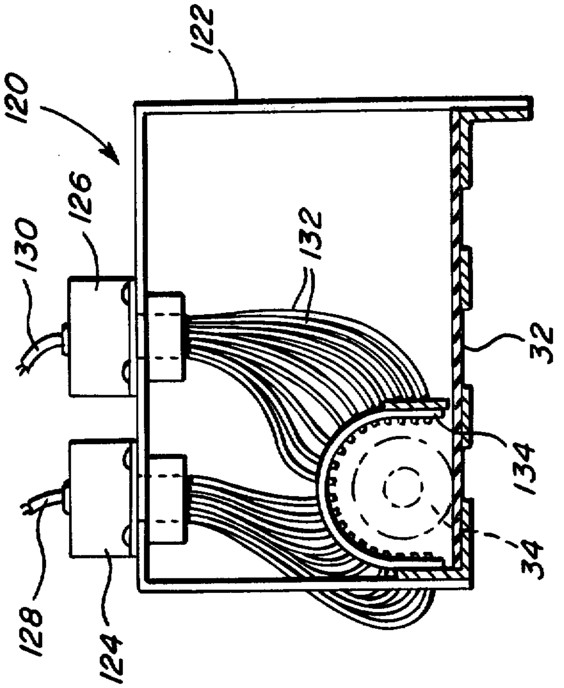
FIG. 10 is a transverse sectional view of the sensing device of the kernel damage grading and removal station, taken generally along the line 10—10 of FIG. 9.
Figure 9:
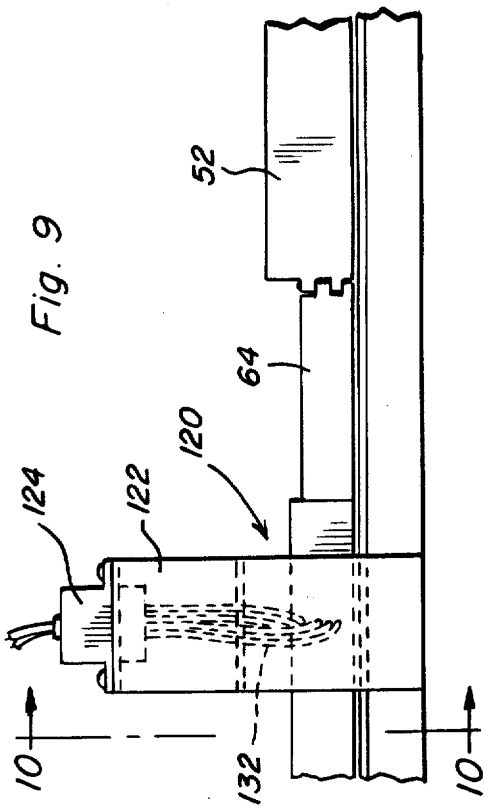
FIG. 9 is a side elevational view illustrating the sensing device of the kernel damage grading and removal station.

Ears 34 which have been inspected at each of stations 36, 38, 40 and 42 and have been found acceptable, pass onto station 44 which inspects each ear 34 for kernel damage. A pair of spaced sensors 46 positioned on opposite sides of ear turnover 55 inspect the whole ear 34 for kernel damage. As ears 34 are positioned along the center of conveyor belt 32, guide walls 114, 116 and 118 properly align each ear of corn 34 past respective sensing devices 46. Associated with each sensing device 46 is a shearing mechanism 48 equivalent to those used in the previous grading and removal stations. Instead of directing a broad beam of light on each individual ear of corn 34, sensors 46 are linked to a scanning tunnel 120 illustrated in FIGS. 9 and 10. Scanning tunnel 120 comprises a frame 122 which holds fiber optic sensors 124 and 126 which are associated with shearing mechanism 48 through leads 128 and 130. A plurality of individual optic fiber tubes 132 are associated with each sensor 124 and 126, although each optic fiber tube 132 may be associated with an individual scanner or all optic tubes 132 may be associated with a single scanning device. The plurality of optic fiber tubes 132 enables light scanning of individual kernels as ears 34 pass through optical fiber support tunnel 134. Support tunnel 134 is of an arcuate shape and holds the individual optical fiber tubes 132 in place as they scan the surface of the ear of corn 34 passing therethrough. By comparing the reflective characteristics of glossy whole kernels with the dull reflection of a smashed or damaged kernel, corn ears 34 which have damaged kernels are rejected by the respective shearing mechanisms 48 which are actuated by the associated sensing devices 46. Optical fiber support tunnel 134 is rigidly attached to frame 122 to insure accurate light inspection of the individual kernels. Each of the respective sensors 46 is associated with an equivalent scanning tunnel 120. Ear turnover 55 insures that substantially all of the kernels on each ear 34 are scanned by the individual optical fiber tubes 132. Acceptable ears 34 which have no damage are conveyed off the end of conveyor belt 32 into a cob sawing process. Short rejected ears and ears with damaged kernels can be sheared off conveyor belt 32 into standard corn cutters. As mentioned previously, the unhusked ears can be directly conveyed back into the husker feed conveyor for husking.

FIGS. 11 through 14 illustrate an alternative scanning tunnel 136 which can be used in place of scanning tunnel 120. Scanning tunnel 136 allows the end of each fiber optic tube 138 to follow the contour of the corn cobs passing through tunnel 136. Inasmuch as optic fibers have a very short focal length of about $\frac{1}{8}$ to $\frac{1}{4}$ inch, and the cob diameters can differ as much as one inch, by allowing the individual fiber optic tubes 138 to follow the contour of the varying diameter cobs, accurate inspection of each cob kernel can be obtained. Each fiber optic tube 138 or small bunch thereof are mounted to the end of a narrow band 140 through attachment port 142 contained on band 140. On the end of band 140 opposite the end containing optical fiber attachment port 142 is roller 144 rotatable about axle 146 welded to the upper surface of band 140. Placed on the center of band 140 and perpendicular thereto is rod 148 welded or otherwise permanently attached to band 140. Coil spring 150 is positioned over rod 148 and placed between band 140 and the inner surface of tunnel bracket 152 through which each rod 148 is passed. The end of each rod 148 is provided with a cap 154 to maintain spring 150 about rod 148. Rod 148 is movable relative to bracket 152 and cap 154. As cob 34 passes through scanning tunnel 136, roller 144 will roll along the cob surface, maintaining the ends of fiber optic tubes 138 at the optimum focal point throughout the length of the cob through the movement of spring supported rod 148, assuring that each kernel is accurately inspected. Enough bands 140 are positioned along tunnel mounting bracket 152 to inspect substantially all of the kernels on about one-half the circumference of the ear of corn 34.

While the preferred sequence of the grading and removal stations is set forth in the drawings, other arrangements of the stations can be utilized successfully. Furthermore, several of the stations may not be required at all times, such as the smut grading and removal station 36 as well as the cob diameter grading and removal station 42. Any known light emitting sensors may be utilized as long as such sensors can inspect and sort acceptable ears of corn from non-acceptable ears in accordance with the teachings and objectives of the present invention.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An automatic corn sorting and inspection system comprising; a plurality of grading and removal stations, each station including a means to sense a particular characteristic of an ear of corn; means to convey an ear of corn past each of said stations, said plurality of stations comprising a short ear grading and removal station comprising means to inspect the length of an ear of corn, an unhusked ear grading and removal station including means to determine if ears of corn contain all or a portion of their husks, and a kernel damage grading and removal station including means to inspect substantially all of the kernels of said ear of corn for damage; each of said stations further including means to remove ears of corn from said conveying means, said means to inspect damaged kernels comprising a plurality of fiber optic tubes positioned above said conveying means and means to transmit light through said optic fiber tubes, means mounting said fiber optic tubes and spring means associated with the mounting means for movement thereof rectilinearly, the ends of said fiber optic tubes being capable of following the contour of the ears of corn which pass through said kernel damage grading and removal station.

2. The system of claim 1 wherein said unhusked ear grading and removal station includes a pair of spaced sensing means and a means to turnover said ear positioned between each of said sensing means thereby allowing the entire ear of corn to be inspected for attached husks.

3. The system of claim 2 wherein said turnover means comprises a roller angularly disposed underneath and in contact with said conveying means as to lift a portion of said conveying means whereby said ears of corn being directed over said lifted portion of said conveying means turnover due to the force of gravity.

4. An automatic sorting and inspection system for articles of food, comprising a plurality of grading and removal stations, each station including means for sensing a particular characteristic of the articles, means for conveying each of the articles through each of the stations, and means for removal of the articles from the conveying means at each of the stations, said sensing means including a plurality of fiber optic tubes having ends positioned above said conveying means, means for transmitting light through said optic fiber tubes, mounting means for anchoring the ends of the optic fiber tubes and spring means connected to the mounting means for rectilinear movement thereof to enable the ends of the optic fiber tubes to follow contours of the articles during travel on the conveying means.

* * * * *